(12) United States Patent
Tamburo et al.

(10) Patent No.: US 12,370,939 B2
(45) Date of Patent: Jul. 29, 2025

(54) SYSTEM, METHOD, AND COMPUTER PROGRAM PRODUCT FOR GENERATING MODIFIED LIGHT EMISSIONS

(71) Applicant: Carnegie Mellon University, Pittsburgh, PA (US)

(72) Inventors: Robert Tamburo, Pittsburgh, PA (US); Srinivasa Narasimhan, Pittsburgh, PA (US); James Hoe, Pittsburgh, PA (US); Anthony Rowe, Pittsburgh, PA (US); Marie Nguyen, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/718,205

(22) PCT Filed: Dec. 9, 2022

(86) PCT No.: PCT/US2022/052354
§ 371 (c)(1),
(2) Date: Jun. 10, 2024

(87) PCT Pub. No.: WO2023/158483
PCT Pub. Date: Aug. 24, 2023

(65) Prior Publication Data
US 2025/0042326 A1    Feb. 6, 2025

Related U.S. Application Data

(60) Provisional application No. 63/288,045, filed on Dec. 10, 2021.

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/056* (2013.01);
(Continued)

(58) Field of Classification Search
CPC .... B60Q 1/085; B60Q 1/143; B60Q 2300/11; B60Q 2300/30; B60Q 2300/31; B60Q 2300/312; B60Q 2300/056
See application file for complete search history.

(56) References Cited

U.S. PATENT DOCUMENTS 5,781,105 A * 7/1998 Bitar ........................ B60Q 1/18
340/439
6,144,158 A * 11/2000 Beam ..................... F21S 41/663
307/10.8
(Continued)

FOREIGN PATENT DOCUMENTS

WO    2020232544 A1   11/2020
WO    2021122329 A1    6/2021

*Primary Examiner* — Robert J May
(74) *Attorney, Agent, or Firm* — The Webb Law Firm

(57) ABSTRACT

Provided are systems, methods, and computer program products for generating modified light emissions. The system includes at least one signal receiver arranged on a vehicle, at least one sensor arranged on the vehicle, at least one lighting system arranged on the vehicle, and at least one processor in communication with the at least one signal receiver, the at least one sensor, and the at least one lighting system, the at least one processor configured to: receive a first signal with the at least one signal receiver; receive sensor data from the at least one sensor; determine lighting data based on the first signal; generate a modified light emission by geometrically transforming the lighting pattern based on the sensor data; and control the at least one lighting system to output the modified light emission.

25 Claims, 9 Drawing Sheets

(52) U.S. Cl.
CPC .. *B60Q 2300/132* (2013.01); *B60Q 2300/134* (2013.01); *B60Q 2300/136* (2013.01); *B60Q 2300/33* (2013.01); *B60Q 2300/45* (2013.01)

(56) References Cited

U.S. PATENT DOCUMENTS

| | | |
|---|---|---|
| 2007/0182528 A1 | 8/2007 | Breed et al. |
| 2016/0046289 A1 | 2/2016 | Elbs |
| 2017/0113664 A1* | 4/2017 | Nix ..................... G07C 5/0891 |
| 2020/0349836 A1* | 11/2020 | Shibata ............... G08G 1/0965 |

* cited by examiner

SYSTEM, METHOD, AND COMPUTER PROGRAM PRODUCT FOR GENERATING MODIFIED LIGHT EMISSIONS

CROSS REFERENCE TO RELATED APPLICATIONS

This application is the United States national phase of International Application No. PCT/US2022/052354 filed Dec. 9, 2022, and claims priority to U.S. Provisional Patent Application No. 63/288,045, filed Dec. 10, 2021, the disclosures of which are hereby incorporated by reference in their entireties.

GOVERNMENT LICENSE RIGHTS

This invention was made with Government support under DTRT13-G-UTC26 awarded by the Department of Transportation, under N00014-14-0595 awarded by the Office of Naval Research, and under CNS-1446601 awarded by the National Science Foundation. The Government has certain rights in the invention.

BACKGROUND

1. Field

This disclosure relates generally to lighting systems and, in non-limiting embodiments, to systems, methods, and computer program products for generating modified light emissions.

2. Technical Considerations

Operating a vehicle on land at night can be challenging due to poor visibility of the driving environment and can be made more challenging when following directions from an electronic navigation system. Driving at night may require illumination of surfaces (e.g., road, runway, etc.) for visualization of features, such as lane markings, sidewalks, curbs, and the surface edge(s). In modern vehicles, forward illumination is conventionally provided by an electric light in a headlamp (e.g., a headlight). Types of headlamps include ones such as low beam (e.g., dipped, passing, and meeting), high beam (e.g., main, driving, and full), and auxiliary (e.g., fog, cornering, spotlights, etc.) to aid in illuminating a given environment under specific conditions.

Ever since the first headlamps were developed in the late 1880s, the primary focus on improving forward illumination has typically been to make them brighter and brighter to naively illuminate the road environment. However, in some driving environments, increased illumination may not help the operator see the driving surface clearly. Examples of challenging driving conditions include surfaces that are covered with snow, dirt, mud, etc., surfaces without markings, surfaces that are curvy, surfaces with edge drop-offs, etc. The problem of poor illumination on curved or winding driving surfaces was addressed in the early 1900s when a headlamp was mechanically linked to the steering wheel to rotate as the steering wheel is manipulated. However, this solution, much like other solutions, relies on mechanical components and does not address other difficult driving conditions.

Electronic navigation systems are often used to guide the vehicle operator to their destination via a digital screen. However, looking away from the road (eye aversion)—even for a short time—can be dangerous. Navigation systems may also provide verbal instructions, but they can cause enough cognitive distraction to negatively affect driving safety and it is common for vehicle operators to look at the screen in response to verbal instructions. Moreover, since driving can require a user's full attention, audible directions may be missed causing the vehicle operator to look away from the road and at the digital screen. Heads-up displays (HUDs) have conventionally attempted to address this problem by projecting the navigation information on or just in front of the windshield (e.g., windscreen). However, these systems require changing eye focus (accommodation reflex) between the near visual field (windshield) and far visual field (driving environment), and vice versa.

SUMMARY

According to non-limiting embodiments or aspects, provided is a vehicle lighting system comprising: at least one signal receiver arranged on a vehicle; at least one sensor arranged on the vehicle; at least one lighting system arranged on the vehicle; and at least one processor in communication with the at least one signal receiver, the at least one sensor, and the at least one lighting system, the at least one processor configured to: receive a first signal with the at least one signal receiver; receive sensor data from the at least one sensor; determine lighting data based on the first signal; generate a modified light emission by transforming the lighting data based on the sensor data; and control the at least one lighting system to output the modified light emission.

In non-limiting embodiments or aspects, the at least one signal receiver comprises a positioning system, the at least one sensor comprises at least one of an inertial sensor and a camera, and the at least one lighting system comprises at least one headlight arranged on the vehicle. In non-limiting embodiments or aspects, the at least one signal receiver comprises an antenna, the first signal comprises a wireless signal received from a transmitter arranged in another vehicle or along a roadway. In non-limiting embodiments or aspects, the at least one sensor comprises an inertial sensor, the sensor data comprises at least one rotational measurement, and wherein transforming the lighting data based on the sensor data comprises applying geometric transformation to the lighting data based on the at least one rotational measurement. In non-limiting embodiments or aspects, the lighting system comprises a spatial light modulator configured to impose varying spatial modulation on light emitted from a light source to emit the modified light emission. In non-limiting embodiments or aspects, the lighting data comprises at least one directional symbol. In non-limiting embodiments or aspects, the lighting data comprises illumination of a lane. In non-limiting embodiments or aspects, the first signal identifies at least one of the following: a lane marking, a traffic sign, a traffic signal, a traffic management indicator, or any combination thereof, the at least one processor further configured to determine a location of the vehicle based on the first signal, the lighting data is determined at least partially based on the location of the vehicle.

In non-limiting embodiments or aspects, the at least one sensor comprises an orientation sensor configured to determine an orientation of the vehicle, and the sensor data comprises orientation data representing the orientation of the vehicle. In non-limiting embodiments or aspects, the determined orientation of the vehicle comprises at least one of pitch, yaw, and roll of the vehicle. In non-limiting embodiments or aspects, the at least one processor further configured to: determine topographical data of at least a portion of a surface surrounding the lighting system based on the first signal, the modified light emission is generated based on the sensor data and the topographical data. In non-limiting embodiments or aspects, the at least one lighting system comprises an array of light emitting diodes configured to be selectively controlled based on the modified light emission.

According to non-limiting embodiments or aspects, provided is a method comprising: receiving, with at least one processor, a first signal from at least one signal receiver; receiving, with the at least one processor, sensor data from at least one sensor arranged on a vehicle; determining, with the at least one processor, lighting data based on the first signal; generating, with the at least one processor, a modified light emission by transforming the lighting data based on the sensor data; and controlling, with the at least one processor, at least one lighting system arranged on the vehicle to output the lighting data.

In non-limiting embodiments or aspects, the at least one signal receiver comprises a positioning system, the at least one sensor comprises at least one of an inertial sensor and a camera, and the at least one lighting system comprises at least one headlight arranged on the vehicle. In non-limiting embodiments or aspects, the at least one signal receiver comprises an antenna, the first signal comprises a wireless signal received from a transmitter arranged in another vehicle or along a roadway. In non-limiting embodiments or aspects, the at least one sensor comprises an inertial sensor, the sensor data comprises at least one rotational measurement, and wherein transforming the lighting data based on the sensor data comprises applying the transformation to the lighting data based on the at least one rotational measurement. In non-limiting embodiments or aspects, the lighting system comprises a spatial light modulator configured to impose varying spatial modulation on light emitted from a light source to emit the modified light emission. In non-limiting embodiments or aspects, the lighting data comprises at least one directional symbol. In non-limiting embodiments or aspects, the lighting data comprises illumination of a lane. In non-limiting embodiments or aspects, the first signal identifies at least one of the following: a lane marking, a traffic sign, a traffic signal, a traffic management indicator, or any combination thereof, the at least one processor further configured to determine a location of the vehicle based on the first signal, the lighting data is determined at least partially based on the location of the vehicle.

In non-limiting embodiments or aspects, the at least one sensor is configured to determine an orientation of the vehicle, and the sensor data comprises orientation data representing the orientation of the vehicle. In non-limiting embodiments or aspects, the determined orientation of the vehicle comprises at least one of pitch, yaw, and roll of the vehicle. In non-limiting embodiments or aspects, further comprising: determining topographical data of at least a portion of a surface surrounding the lighting system based on the first signal, the modified light emission is generated based on the sensor data and the topographical data. In non-limiting embodiments or aspects, the at least one lighting system comprises an array of light emitting diodes configured to be selectively controlled based on the modified light emission.

According to non-limiting embodiments or aspects, provided is a computer program product comprising at least one non-transitory computer-readable medium including program instructions that, when executed by at least one processor, cause the at least one processor to: receive a first signal with at least one signal receiver; receive sensor data from at least one sensor arranged on a vehicle; determine lighting data based on the first signal; generate a modified light emission by transforming the lighting data based on the sensor data; and control at least one lighting system arranged on the vehicle to output the modified light emission.

Further non-limiting embodiments are recited in the following clauses:

Clause 1: A vehicle lighting system comprising: at least one signal receiver arranged on a vehicle; at least one sensor arranged on the vehicle; at least one lighting system arranged on the vehicle; and at least one processor in communication with the at least one signal receiver, the at least one sensor, and the at least one lighting system, the at least one processor configured to: receive a first signal with the at least one signal receiver; receive sensor data from the at least one sensor; determine lighting data based on the first signal; generate a modified light emission by transforming the lighting data based on the sensor data; and control the at least one lighting system to output the modified light emission.

Clause 2: The system of clause 1, wherein the at least one signal receiver comprises a positioning system, wherein the at least one sensor comprises at least one of an inertial sensor and a camera, and wherein the at least one lighting system comprises at least one headlight arranged on the vehicle.

Clause 3: The system of any of clauses 1-2, wherein the at least one signal receiver comprises an antenna, wherein the first signal comprises a wireless signal received from a transmitter arranged in another vehicle or along a roadway.

Clause 4: The system of any of clauses 1-3, wherein the at least one sensor comprises an inertial sensor, wherein the sensor data comprises at least one rotational measurement, and wherein transforming the lighting data based on the sensor data comprises applying the transformation to the lighting data based on the at least one rotational measurement.

Clause 5: The system of any of clauses 1-4, wherein the lighting system comprises a spatial light modulator configured to impose varying spatial modulation on light emitted from a light source to emit the modified light emission.

Clause 6: The system of any of clauses 1-5, wherein the lighting data comprises at least one directional symbol.

Clause 7: The system of any of clauses 1-6, wherein the lighting data comprises illumination of a lane.

Clause 8: The system of any of clauses 1-7, wherein the first signal identifies at least one of the following: a lane marking, a traffic sign, a traffic signal, a traffic management indicator, or any combination thereof, the at least one processor further configured to determine a location of the vehicle based on the first signal, wherein the lighting data is determined at least partially based on the location of the vehicle.

Clause 9: The system of any of clauses 1-8, wherein the at least one sensor comprises an orientation sensor configured to determine an orientation of the vehicle, and wherein the sensor data comprises orientation data representing the orientation of the vehicle.

Clause 10: The system of any of clauses 1-9, wherein the determined orientation of the vehicle comprises at least one of pitch, yaw, and roll of the vehicle.

Clause 11: The system of any of clauses 1-10, the at least one processor further configured to: determine topographical data of at least a portion of a surface surrounding the lighting system based on the first signal, wherein the modified light emission is generated based on the sensor data and the topographical data.

Clause 12: The system of any of clauses 1-11, wherein the at least one lighting system comprises an array of light emitting diodes configured to be selectively controlled based on the modified light emission.

Clause 13: A method comprising: receiving, with at least one processor, a first signal from at least one signal receiver; receiving, with the at least one processor, sensor data from at least one sensor arranged on a vehicle; determining, with the at least one processor, lighting data based on the first signal; generating, with the at least one processor, a modified light emission by transforming the lighting data based on the sensor data; and controlling, with the at least one processor, at least one lighting system arranged on the vehicle to output the lighting data.

Clause 14: The method of clause 13, wherein the at least one signal receiver comprises a positioning system, wherein the at least one sensor comprises at least one of an inertial sensor and a camera, and wherein the at least one lighting system comprises at least one headlight arranged on the vehicle.

Clause 15: The method of any of clauses 13-14, wherein the at least one signal receiver comprises an antenna, wherein the first signal comprises a wireless signal received from a transmitter arranged in another vehicle or along a roadway.

Clause 16: The method of any of clauses 13-15, wherein the at least one sensor comprises an inertial sensor, wherein the sensor data comprises at least one rotational measurement, and wherein transforming the lighting data based on the sensor data comprises applying the transformation to the lighting data based on the at least one rotational measurement.

Clause 17: The method of any of clauses 13-16, wherein the lighting system comprises a spatial light modulator configured to impose varying spatial modulation on light emitted from a light source to emit the modified light emission.

Clause 18: The method of any of clauses 13-17, wherein the lighting data comprises at least one directional symbol.

Clause 19: The method of any of clauses 13-18, wherein the lighting data comprises illumination of a lane.

Clause 20: The method of any of clauses 13-19, wherein the first signal identifies at least one of the following: a lane marking, a traffic sign, a traffic signal, a traffic management indicator, or any combination thereof, the at least one processor further configured to determine a location of the vehicle based on the first signal, wherein the lighting data is determined at least partially based on the location of the vehicle.

Clause 21: The method of any of clauses 13-20, wherein the at least one sensor is configured to determine an orientation of the vehicle, and wherein the sensor data comprises orientation data representing the orientation of the vehicle.

Clause 22: The method of any of clauses 13-21, wherein the determined orientation of the vehicle comprises at least one of pitch, yaw, and roll of the vehicle.

Clause 23: The method of any of clauses 13-22, further comprising: determining topographical data of at least a portion of a surface surrounding the lighting system based on the first signal, wherein the modified light emission is generated based on the sensor data and the topographical data.

Clause 24: The method of any of clauses 13-23, wherein the at least one lighting system comprises an array of light emitting diodes configured to be selectively controlled based on the modified light emission.

Clause 25: A computer program product comprising at least one non-transitory computer-readable medium including program instructions that, when executed by at least one processor, cause the at least one processor to: receive a first signal with at least one signal receiver; receive sensor data from at least one sensor arranged on a vehicle; determine lighting data based on the first signal; generate a modified light emission by transforming the lighting data based on the sensor data; and control at least one lighting system arranged on the vehicle to output the modified light emission.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying drawings, in which.

DETAILED DESCRIPTION

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have,"

"having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer.

Non-limiting embodiments or aspects disclosed herein include a lighting system that augments driving surfaces (e.g., such as roadways) to increase and improve visibility of a driving path and/or present the vehicle operator information on the driving surface, which limits eye aversion and accommodation. Such light emissions are output and controlled by illuminating or not illumining specific regions of the driving surface with lighting patterns (e.g., paths, shapes, text, images, and/or the like). For example, some non-limiting embodiments or aspects described herein include direct augmentation of a road surface with visible light structured after a lighting pattern, including navigational information (e.g., directional arrows, street names, addresses, and/or the like), boundaries of the driving path (e.g., one or more specific lanes of travel), warnings (e.g., about road conditions or other vehicles), speed limits, traveling speed, and/or other like information. In some non-limiting embodiments or aspects, a lighting pattern may include a dynamic adjustment of illumination over a space. For example, a light emission may be configured to avoid illumination of obstacles in the road environment, to illuminate the driving surface with a mixture of white and color-filtered light, to illuminate or not illuminate the driving path (e.g., lane of travel) and adjacent paths with different brightness levels, and/or the like.

Figure 1:
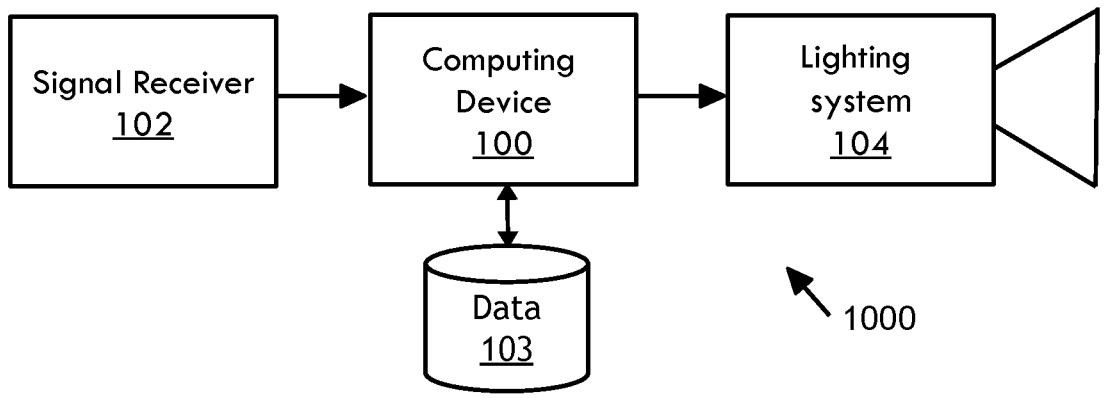
FIG. 1 illustrates a system for generating a modified light emission according to non-limiting embodiments or aspects.

Referring to FIG. 1, a system 1000 for generating a modified light emission is shown according to non-limiting embodiments. A computing device 100 may include, for example, one or more processors (e.g., central processing units (CPUs), microprocessors, controllers, field programmable gate arrays, digital signal processors (DSPs), Application Specific Integrated Circuits (ASICs), Graphics Processing Unit (GPU), systems on a chip, other programmable logic devices, and/or a combination of such devices). The computing device may be arranged in a vehicle. In some examples, the computing device 100 may be separate from a vehicle but in communication with an on-board vehicle computing device. It will be appreciated that various arrangements are possible. The computing device 100 is in communication with a signal receiver 102. The signal receiver 102 may include, for example, a Global Positioning System (GPS) receiver (e.g., a GPS antenna) and/or a GNSS (Global Navigation Satellite System) receiver that receives signals from a satellite. Additionally or alternatively, the signal receiver 102 may include one or more antennas, modems, and/or the like configured to receive signals from other devices and/or vehicles, such as, but not limited to, radio frequency signals transmitted from roadside devices, other vehicles, one or more servers, and/or the like.

With continued reference to FIG. 1, the computing device 100 is in communication with a lighting system 104. The lighting system 104 may be arranged on the vehicle. In non-limiting embodiments, the lighting system may be an array of light emitting diodes (LEDs) that can be selectively controlled by the computing device 100. It will be appreciated that any sort of light-emitting device may be used, such as lightbulbs, lasers, projectors, combinations of such devices, and/or the like. In non-limiting embodiments, the lighting system 104 may include one or more lenses, filters, light sources, mirrors, and/or the like to control a light emission. In non-limiting embodiments, a lighting system may include or be separate from a light source, such as LEDs, high-intensity discharge (HID) lights, or other types of light-emitting devices. In non-limiting embodiments, a lighting system may include a liquid crystal display (LCD) or other like device arranged in front of a light source. It will be appreciated that other arrangements are possible.

In non-limiting embodiments, the lighting system 104 may be arranged in the front of a vehicle as headlights configured to illuminate a region in front of the vehicle. The lighting system 104 may be part of or separate from a vehicle headlight system. For example, if a field-of-view of a light projector lens for outputting a modified light emission is as wide as a region to be illuminated, the light that does not illuminate the driving surface to display the modified light emission may be used as a forward lighting system (e.g., headlights). In non-limiting embodiments, the computing device 100 generates and communicates signals (e.g., digital signals, electro-mechanical control signals, and/or the like) to control the lighting system. For example, spatial light modulators may be mechanically actuated based on control signals from the computing device 100 to selectively steer and direct one or more light beams to output particular light emission.

Still referring to FIG. 1, the computing device 100 may be in communication with a database 103 stored on a data storage device. The database 103 may be local or remote to the vehicle. The database 103 may store lighting data that can be output as a light emission. Lighting data may include any data representing or identifying one or more patterns, icons, images, symbols, words, numbers, and/or the like, that can be output by a lighting system as one or more light emissions displayed on a driving surface. Lighting data may include, for example, text, vector images, bitmap images, pointers (e.g., Uniform Resource Locators) to text or image assets, and/or the like.

In operation, the computing device may receive one or more signals from the signal receiver, determine lighting data from the database 103 based on the signal(s), and generate a modified light emission based on transforming the lighting data so that it is viewable from the vehicle operator's (e.g., driver's) perspective on a surface external to the vehicle (e.g., a roadway in front of the vehicle). Such a transformation may include a geometric transformation function that geometrically alters an original light emission represented by lighting data by, for example, skewing and/or warping an image that is intended as the light emission. Other non-geometric transformations may additionally or alternatively be applied, such as color transformations, brightness transformations, contrast transformations, and/or the like.

As an example, in non-limiting embodiments in which the signal receiver 102 includes a GPS receiver or a modem with network connectivity, the computing device 100 may determine navigation directions based on the location of the vehicle and an intended destination. The navigation directions may include arrows (e.g., right turn, left turn, lane change, etc.), text and/or numbers (e.g., distance to next turn, speed limits, etc.), driving path delineations (e.g., lines, arrows, lanes, and/or the like), signs or icons (e.g., stop signs, symbols, warnings, and/or the like). Additionally or alternatively to navigation information, non-limiting embodiments may display any other type of information such as vehicle speed limits, vehicle speed, low fuel warnings, approaching crash warnings, construction zone warnings, and/or the like. Such information may be received as signals from any source local or remote from the vehicle.

Determining lighting data may involve identifying navigation directions to display (e.g., one or more arrows or symbols) from the database 103 or from the signal itself. Generating the modified light emission may involve geometrically transforming the navigation directions based on a road surface, orientation of the vehicle, angle of the lighting system, and/or the like. For example, if the lighting data is an arrow, the modified light emission may stretch and/or deform the arrow such that, when it is displayed on a road surface in front of a vehicle (e.g., projected at an angle), it appears as the arrow.

In non-limiting embodiments, the system 1000 employs an architecture that includes hardware interfaces and software for connecting and receiving data from various different systems devices. In non-limiting embodiments, the architecture may be optimized for speed in order to keep latency at a minimum to permit operation at high speeds. In non-limiting embodiments, the architecture may also automatically and dynamically reconfigure itself to execute algorithms needed to meet performance requirements. Since vehicles can be piloted at high speeds, the system may process data and illuminate the driving surface quick enough to be useful to the operator. In non-limiting embodiments, the hardware components (e.g., light projector, processors, and/or the like) are tightly coupled via high-speed, high-bandwidth interfaces. Software may be parallelized in non-limiting embodiments to permit various tasks (e.g., image detection, generation of control signals, generating a modified light emission, and/or the like) of the system to be concurrently executed. Algorithms may be configured for speed through low-level optimization. The architecture may also be configured to be flexible in utilizing different types of computing processors to meet specific timing or accuracy requirements. In non-limiting embodiments, tasks may be scheduled based on prioritization and executed on the type of computing processor needed to meet the requirement. The architecture may also provide an interface for receiving input parameters from the vehicle operator and dynamically making the necessary adjustments to meet the vehicle operator's specification.

Figure 2:
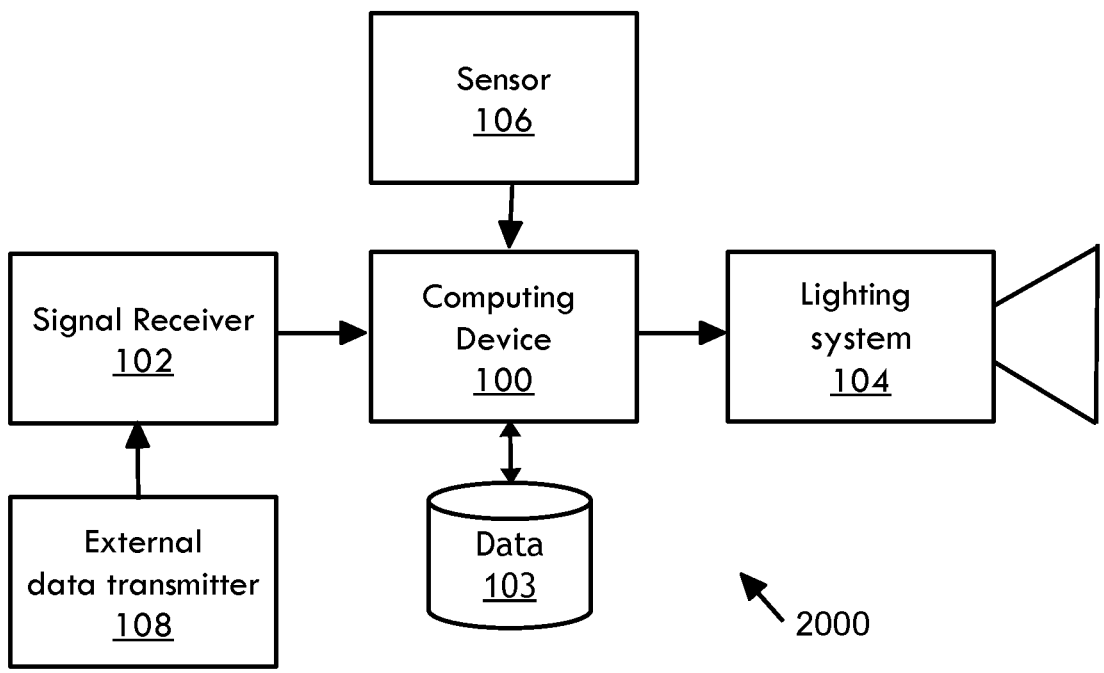
FIG. 2 illustrates another system for generating a modified light emission according to non-limiting embodiments or aspects.

Referring to FIG. 2, a system 2000 for generating a modified light emission is shown according to non-limiting embodiments. The system 2000 includes a signal receiver 102, computing device 100, database 103, and lighting system 104 as described in connection with FIG. 1. In the non-limiting embodiment shown in FIG. 2, the system 2000 also includes a sensor 106 that collects sensor data from an environment. One or more sensors 106 may be arranged on the vehicle and include, for example, an orientation sensor, an inertial sensor (e.g., inertial measurement unit), a visual camera, a LIDAR or RADAR camera, a wireless communication sensor, and/or the like. As an example, vehicles and/or individuals with user devices may broadcast and/or receive locations (e.g., such as relative locations) to and from others, and such location signals may be sensed by a wireless communication sensor and used as a signal input. Some embodiments may not include a sensor 106 and may generate the modified light emission based on predetermined transformation rules and/or data from the one or more signals received by the signal receiver 102. In non-limiting embodiments in which the sensor 106 includes a camera unit or other similar image-based sensor, one or more computer vision algorithms may be used to detect objects in a field-of-view of the camera, such as other vehicles, signs, lanes, lane markers, and/or the like. In non-limiting embodiments, a sensor 106 may be configured to determine the relative and/or geospatial location of other entities, such as vehicle(s), person(s), and/or other objects.

In embodiments including one or more sensors 106, sensor data from the sensor 106 may be used to determine a transformation that is applied to the lighting data to generate the modified light emission. In this manner, the transformation may differ depending on the road surface (e.g., angle, texture, color, and/or the like). In non-limiting embodiments, a light emission of text or a sign may be skewed as a function of the angle between the lighting system and a plane of the road surface. As an example, a square sign for a light emission may be skewed into a trapezoid, for an example, so that when the modified light emission is output by the lighting system and is skewed in the opposite manner, a square appears on the road surface.

With continued reference to FIG. 2, the system 2000 further includes an external data transmitter 108 in communication with the signal receiver. For example, the external data transmitter 108 may include a radio frequency transmitter on the side of a road, embedded in a road, in another vehicle, in or attached to a road sign, and/or the like. The external data transmitter 108 may transmit navigation data, roadway data, and/or other data (e.g., lighting data, pointers to network resources, and/or the like) via any signal communication protocol. For example, protocols such as Bluetooth®, Near-Field Communication (NFC), Wi-Fi®, and/or the like may be used. In non-limiting embodiments, data received from an external data transmitter 108 may be used alternatively to or in addition to data received from another source (e.g., GPS). In some examples, multiple signal receivers 102 may be arranged on the vehicle to receive signals from multiple different sources (e.g., an external data transmitter 108 and a satellite).

In some non-limiting embodiments, a display device may be included in the vehicle or in communication with the vehicle that visualizes data. For example, a display device may visualize sensor data from the sensor 106 including a driving surface, detected objects, and/or the like. In some examples, a display device may provide a preview image of a modified light emission that a user can adjust with one or more input devices. Through an input device, such as buttons, touchscreens, voice control, mobile computing devices, and/or the like, a user may adjust the amount of skew, warping, magnification, and/or the like, and may save the user input as personal preferences. A user may also control other parameters through an input device, such as brightness, contrast between different sections of a light emission, color, enabling or disabling functions, and/or other parameters that may be used to determine lighting data and/or generate a modified light emission. Sets of parameters may be stored and loaded by the vehicle operator. Parameters may propagate through the system architecture in real-time providing instantaneous or near-instantaneous augmentation of the driving surface.

Figure 3:
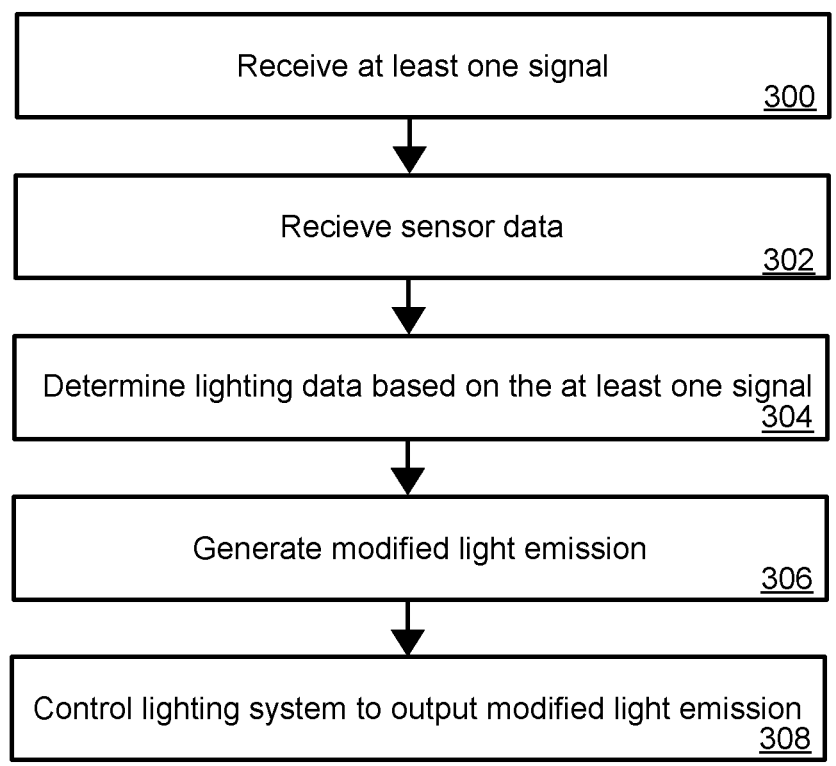
FIG. 3 illustrates a flow diagram for generating a modified light emission according to non-limiting embodiments or aspects.

Referring now to FIG. 3, a flow diagram is shown for a method of generating a modified light emission according to non-limiting embodiments. The steps shown in FIG. 3 are for example purposes only. It will be appreciated that additional, fewer, different, and/or a different order of steps may be used in non-limiting embodiments. At a first step 301, at least one signal is received. For example, one or more signals may be received by one or more signal receivers arranged on the vehicle (e.g., inside the vehicle, on an external surface of the vehicle, and/or the like). The signal(s)

may include, for example, navigation data from a GPS satellite and/or wireless Internet source, roadway data from a transmitting device (e.g., an external data transmitter), and/or the like. The signal(s) may be received by a signal receiving device such as an antenna, a GPS receiver, and/or the like.

At step 302 of FIG. 3, sensor data is received from one or more sensors. In some examples, the one or more sensors may be arranged on the vehicle (e.g., inside the vehicle, on an external surface of the vehicle, and/or the like). The sensors may include, for example, an orientation sensor, an inertial sensor, a visual camera, a LIDAR or RADAR camera, and/or the like. In some non-limiting embodiments, the sensor data may represent the pitch, yaw, and/or roll of the vehicle orientation.

At step 304 of FIG. 3, lighting data is determined based on the signal(s) received at step 300. Lighting data may represent one or more patterns, icons, images, text, and/or the like. In non-limiting embodiments, lighting data may be encoded as a signal that is received by a signal receiver. In non-limiting embodiments, lighting data may be stored in a database local or remote from the vehicle and determined based on one or more identifiers in the received signal(s). In some non-limiting embodiments, determining lighting data includes at least partially generating lighting data based on numbers, text, indicators, and/or the like in the received signal(s). In non-limiting embodiments, lighting data may include a two-dimensional image.

At step 306 of FIG. 3, a modified light emission is generated. A modified light emission may be generated in non-limiting embodiments by applying one or more transformation functions to the lighting data determined at step 304. For example, a geometric transformation may be applied to skew, stretch, bend, and/or warp a light emission represented by lighting data to generate a modified light emission. In non-limiting embodiments, the sensor data received at step 302 may be used to determine a mathematical transformation function (e.g., a transformation algorithm) to apply to the lighting data. In non-limiting embodiments, lighting data includes a two-dimensional image that is transformed to the plane of the driving surface in front of the vehicle so as to not appear distorted to the vehicle operator.

In non-limiting embodiments, a lighting system mounted in a fixed position and orientation on a vehicle may be calibrated from predetermined distances, orientations, and optical properties of the lighting system (e.g., of a light projector lens) at a time that the system is configured. Such calibration and configuration may be performed with predetermined mathematical transformation functions that are based on the distances, orientations, and/or optical properties.

In non-limiting embodiments, a lighting system may be calibrated based on one or more camera units used as a sensor. For example, in a testing environment, a number of geometric features may be placed (physically or by projection) onto a relatively flat surface or a surface having an angle that is known. The positions of these features on the surface are measured. An image or images of the geometric features may be captured with a camera unit that is along the viewing axis as the vehicle operator. The effects of camera lens distortion may then be removed from the image. The features may then be extracted from the image using one or more image segmentation algorithms and/or the like. The pixel coordinates of the features are determined and used along with the physically measured position of the features on the surface to compute a standard homographic transformation matrix. Applying this matrix to lighting data will transform it to appear geometrically correct by the vehicle operator (or any other observer from that perspective) as long as it is projected on a driving surface of the same orientation plane as in calibration.

In non-limiting embodiments, a lighting system may be dynamically calibrated during operation based on one or more camera units used as a sensor. For example, a transformation matrix may need to be recalculated any time the system is repositioned or when the driving surface dramatically changes. A dynamic method of calibration involves displaying (e.g., by projecting with a lighting system) a light emission on the driving surface that includes one or more geometric features (e.g., such as squares, lines, or other shapes) as a fixed pattern. The camera unit may then capture the projection of the fixed pattern, the features may be extracted from the image with one or more image segmentation algorithms, and a transformation matrix may then be generated between the features in the captured image(s) and the fixed pattern to dynamically adjust the transformation matrix for real-time conditions of the driving surface. In non-limiting embodiments, this calibration procedure may be performed in real time—while the vehicle is in operation. In some non-limiting embodiments, the fixed pattern may not be visible to the operator if the projection occurs over a short duration and the camera(s) captures the image(s) with a short exposure, which may be synchronized with the projection.

In non-limiting embodiments in which a driving surface is not flat in the region in which a light emission may be displayed, the driving surface may be estimated and the lighting data may be transformed to match the conditions of the surface. As an example, parameters of the driving surface may be estimated by capturing images of the surface while projecting fixed patterns containing geometric features. This may be performed with structured light methods. Additionally or alternatively, sensors may be used to accurately localize the vehicle's global position (e.g., latitude, longitude, and elevation), which can be looked up in a map database. The topography of the region in front of the vehicle may be extracted from the map database and used to transform (e.g., deform) the lighting data to generate a modified light emission that conforms to the driving surface. The vehicle's orientation (roll, pitch, and yaw) from sensors can be used to further deform the light pattern for more accurate augmentation of the non-uniform driving surface.

Forward-facing lighting systems may be mechanically tilted to stay level with the driving surface when the vehicle's orientation with respect to the driving surface would aim the headlights away from the road. For example, the vehicle's pitch as it reaches the peak of an incline will aim fixed headlights toward the sky instead of onto the driving surface. In non-limiting embodiments, the lighting system digitally compensates, rather than or in addition to mechanically compensates, the output to maintain illumination on the driving surface by generating a modified light emission. For example, the vehicle's position and orientation may be measured from one or more sensors (e.g., such as an inertial sensor) and used to compute the transformation function to compensate for the orientation differential with the driving surface ahead of the vehicle. The transformation may be applied to the illumination pattern before or after one of the calibration procedures discussed herein.

At step 308 of FIG. 3, the lighting system is controlled to output the modified light emission generated at step 306. For example, a computing device (e.g., such as an on-board vehicle controller) may control one or more devices of the lighting system to display the modified light emission outside of the vehicle, such as but not limited to a road surface in front of a vehicle. This may include sending a control signal to the lighting system that encodes the modified light emission. In some examples, controlling the lighting system may include selectively activating and/or deactivating individual lighting units, actuating one or more motors or other devices associated with lenses, light sources, reflectors, filters, and/or the like, activating a supplementary light source, and/or the like. In some non-limiting embodiments, outputting the modified light emission may include dynamically adjusting the focus point of a light source(s) so the pattern remains sharply focused to the operator. The lighting system may be part of or in addition to a vehicle headlight system.

In non-limiting embodiments, errors from software computations, sensors, signal interference, and/or the like may be reduced by modifying the lighting data. For example, transitional boundaries between high contrast areas may be blurred by modulating the brightness of the light along high-contrast boundaries. In non-limiting embodiments, such modulation may be based on a user setting or preference for users that find sharp transitional boundaries to be distracting or otherwise undesirable.

Figure 4A:
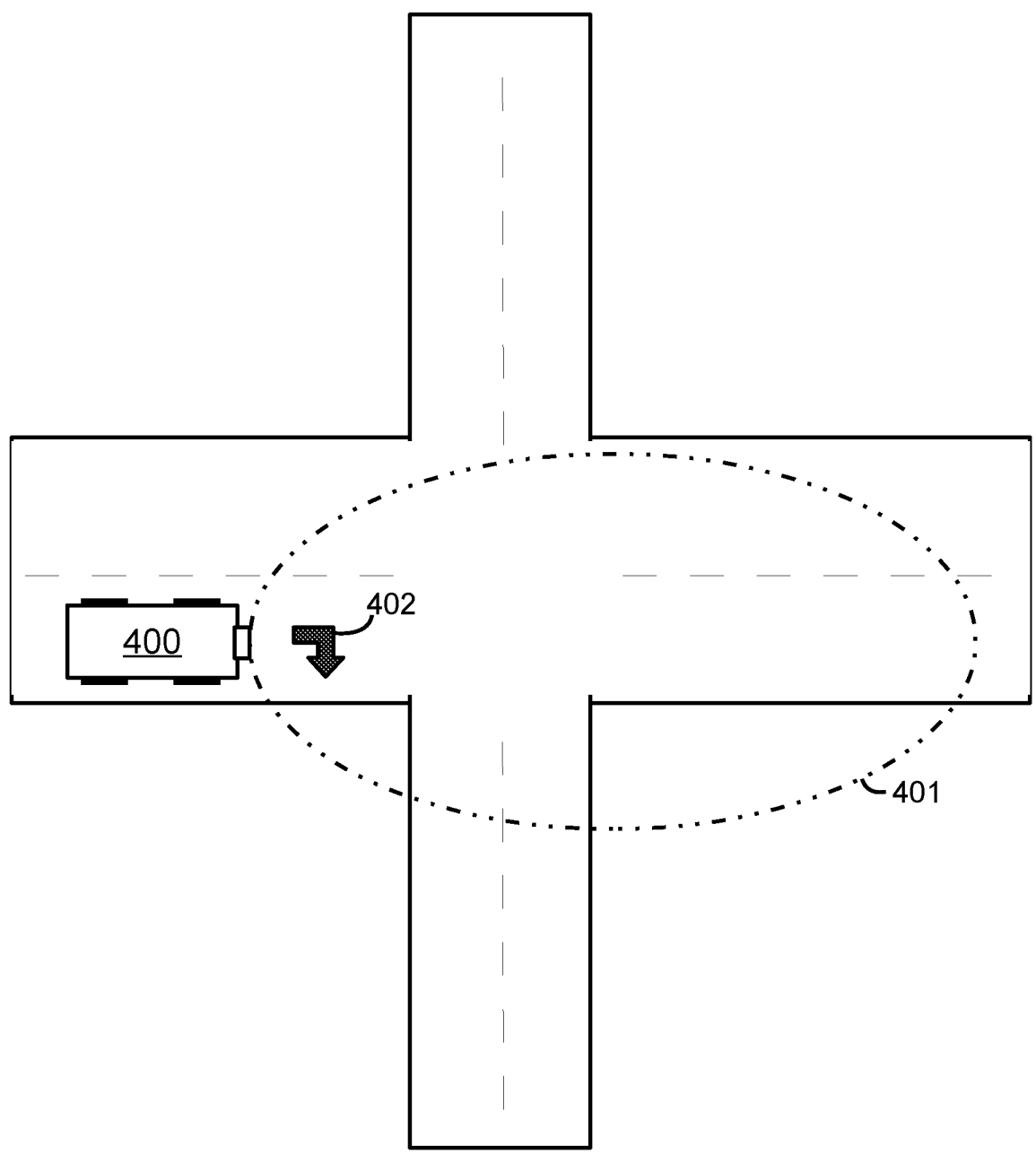
FIGS. 4A and 4B illustrate example implementations of a system for generating a modified light emission according to non-limiting embodiments or aspects.
Figure 4B:
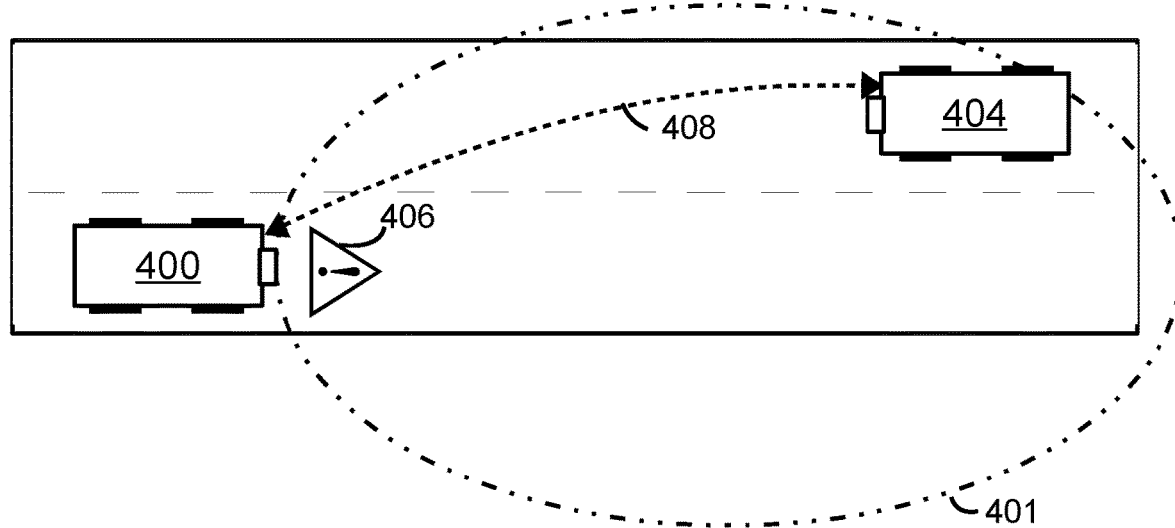

Referring now to FIGS. 4A and 4B, example scenarios are shown according to non-limiting embodiments. In FIG. 4A, a vehicle 400 traveling on a roadway includes a lighting system that outputs a directional arrow 402 as a light emission that is displayed on the road surface in front of the vehicle 400. As shown in the example of FIG. 4A, the lighting system of the vehicle 400 illuminates a region 401 of the surrounding environment and the directional arrow 402 appears within this illuminated region. The directional arrow 402 indicating a right turn may be based on navigation directions received from a navigation system, as an example. In FIG. 4B, a vehicle 400 is approaching another vehicle 404 and the lighting system of the vehicle 400 outputs a warning symbol 406 as a light emission that is displayed on the road surface in front of the vehicle 400. In the example shown in FIG. 4B, the warning symbol 406 may be based on one or more signals 408 received by a signal receiving device of the vehicle 400 from the vehicle 404. For example, a signal transmitter on the vehicle 404 may communicate one or more signals indicating the presence of the vehicle 404, a hazardous or oversized load being carried by the vehicle 404, and/or the like. The signal(s) may include the warning symbol 406 or an identifier corresponding to the warning symbol, as examples. It will be appreciated that such signal(s) may be received from other sources.

Referring now to FIGS. 5A-5D, example scenarios are shown according to non-limiting embodiments. As shown in these examples, the modified light emission may have varying levels of brightness based on the different paths available (e.g., driving lanes, shoulders, sidewalks, median strips, and/or the like). In non-limiting embodiments in which lights are on or off, brightness may be adjusted by temporal modulation.

Figure 5A:
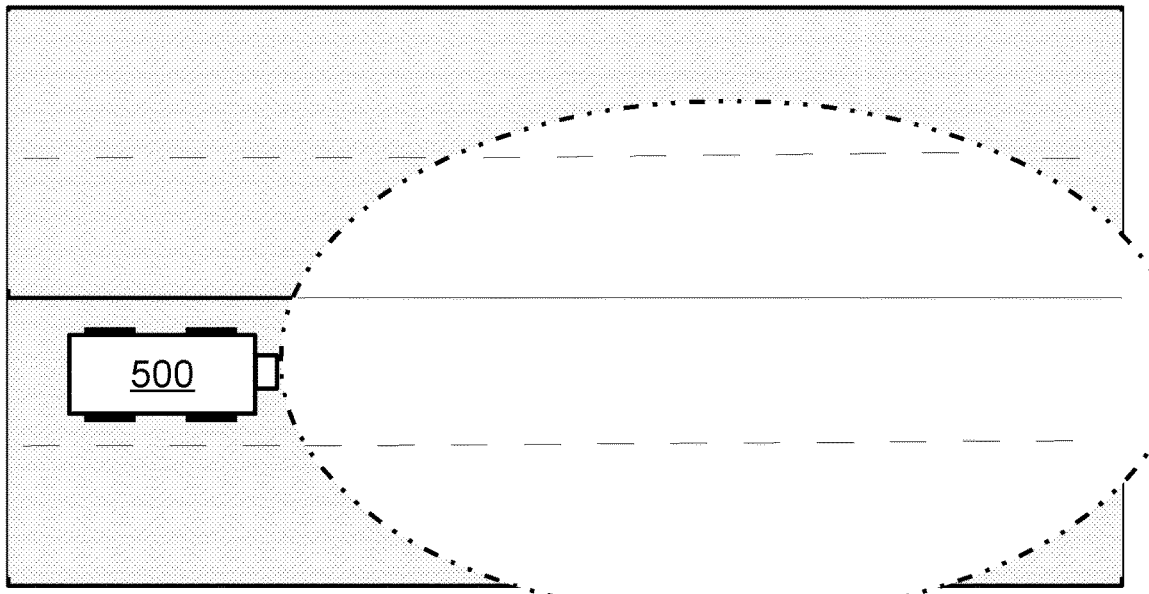
FIGS. 5A-5D illustrate further example implementations of a system for generating a modified light emission according to non-limiting embodiments or aspects.
Figure 5B:
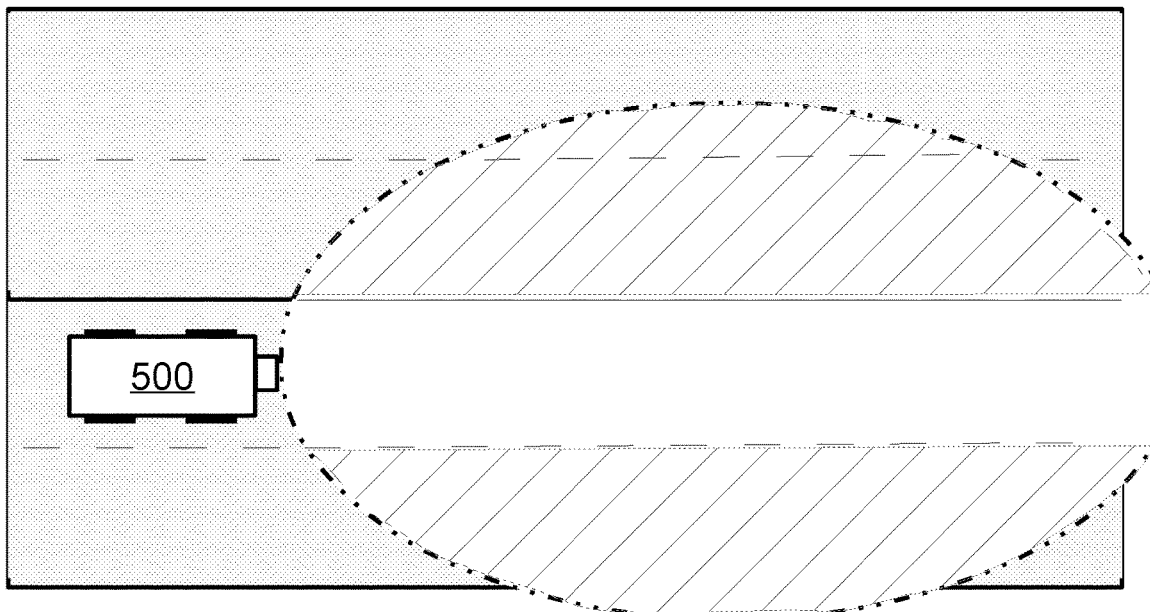
Figure 5C:
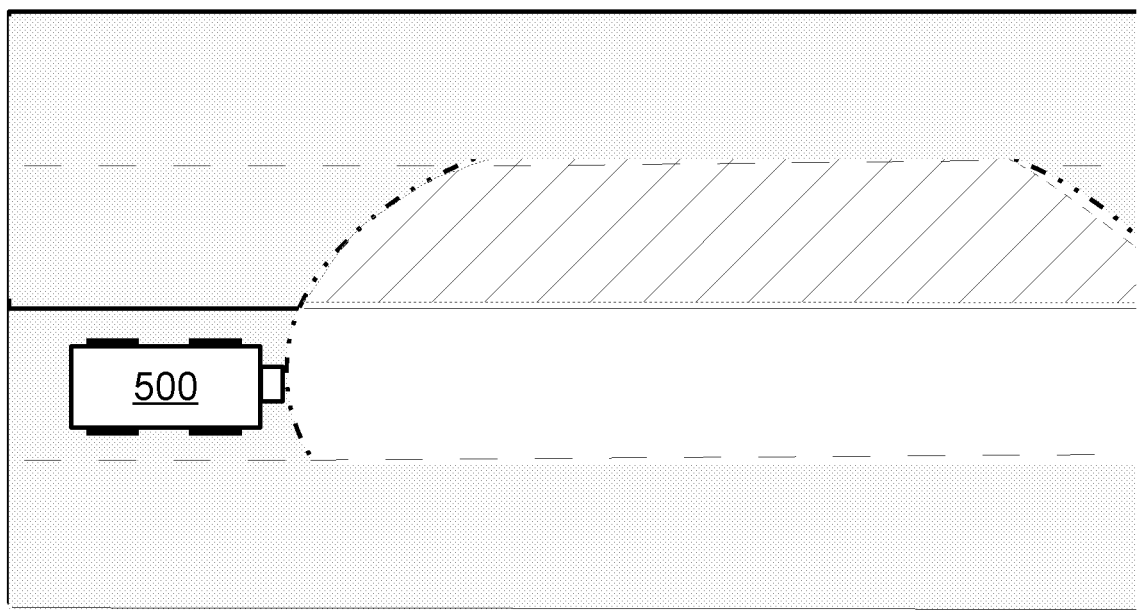
Figure 5D:
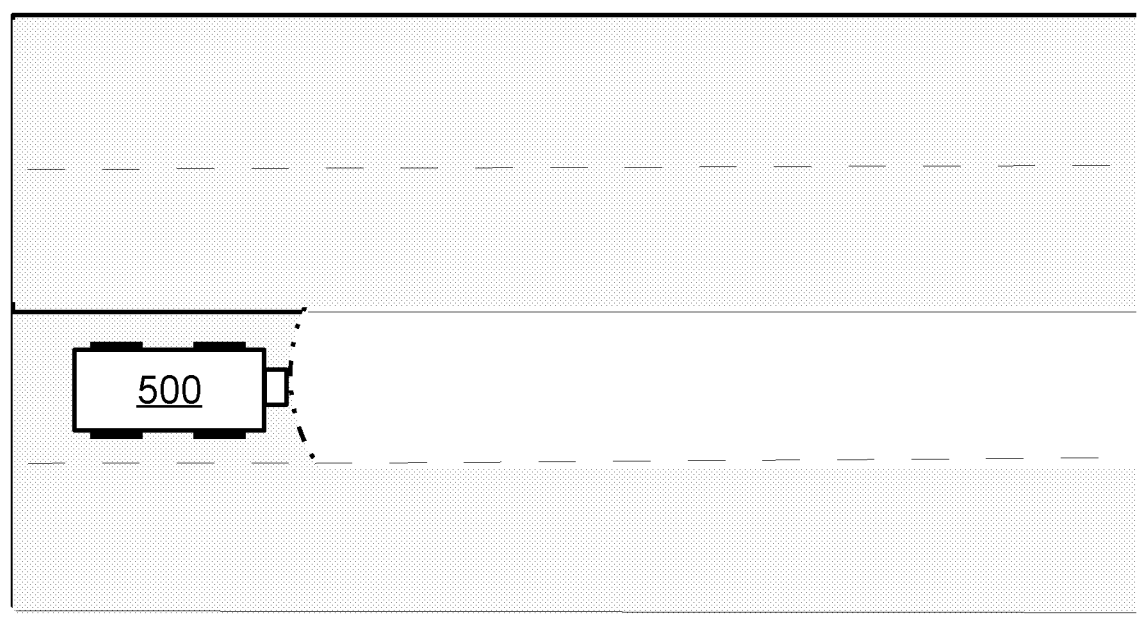

In FIG. 5A, a vehicle 500 has a lighting system that illuminates a region of the roadway in front of it. FIG. 5B illustrates a non-limiting embodiment in which the lighting data includes or represents a lane-specific light emission. For example, the light emission in FIG. 5B may be controlled to provide a brightest illumination in the lane that the vehicle 500 is in and a relatively dimmer illumination to adjacent lanes such that the adjacent lanes are illuminated to a lesser degree than the lane of travel. FIG. 5C illustrates a non-limiting embodiment in which the lighting data includes or represents a lane-specific light emission that brightly illuminates the lane of travel, illuminates one adjacent lane to a lesser degree than the lane of travel, and does not illuminate (or illuminates to an even lesser degree) the other adjacent lane. FIG. 5D illustrates a non-limiting embodiment in which the lighting data includes or represents a lane-specific light emission that illuminates only the lane of travel. In the examples shown in FIGS. 5A-5D, one or more signals including roadway data may be received and used to determine the light emissions shown. For example, roadway data may indicate a number of lanes, the direction of travel of each lane, road conditions, and/or the like. Moreover, one or more signals received from other vehicles (not shown in FIGS. 5A-5D) may be used to determine the light emissions shown in FIGS. 5A-5D.

In non-limiting embodiments, light emissions that may be projected onto physical objects, markers, or portions of a driving surface may be dynamically updated as the vehicle approaches the location. In order to dynamically update the light emission, the lens of a light projector of a lighting system may be adjusted to keep the pattern in focus for the vehicle operator as the vehicle gets closer or farther away. In non-limiting embodiments, dynamically updating the light emission involves estimating the distance to the location via positional information of the vehicle and/or location of the target object or marker. In some non-limiting embodiments, light emissions may vary in time and/or distance to assist the vehicle operator. For example, turn arrows may blink as the vehicle approaches a turn and blink at a faster rate as the vehicle gets much closer to the turn. Additionally or alternatively, the light emissions can vary in distance to the vehicle and size. In some non-limiting embodiments, light emissions may be black and white light patterns (e.g., consisting of only white light and no light). In some non-limiting embodiments, light emissions may be colorized through one or more colored filters and/or light sources (e.g., colored LEDs, optics, and/or color gels) may be used to project the desired color or colors to the driving surface. In some non-limiting embodiments, transforming lighting data to generate a modified light emission may include adjusting one or more colors based on the color and/or brightness of the driving surface.

Figure 6A:
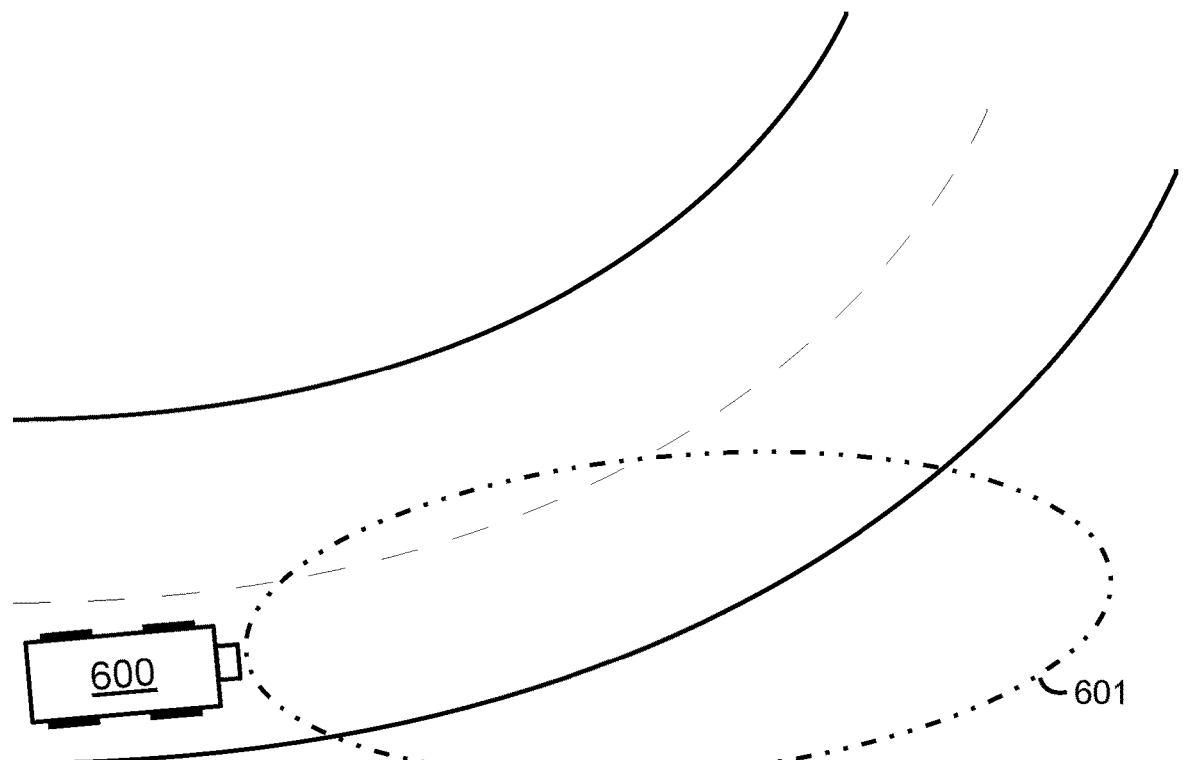
FIGS. 6A and 6B illustrate further example implementations of a system for generating a modified light emission according to non-limiting embodiments or aspects.
Figure 6B:
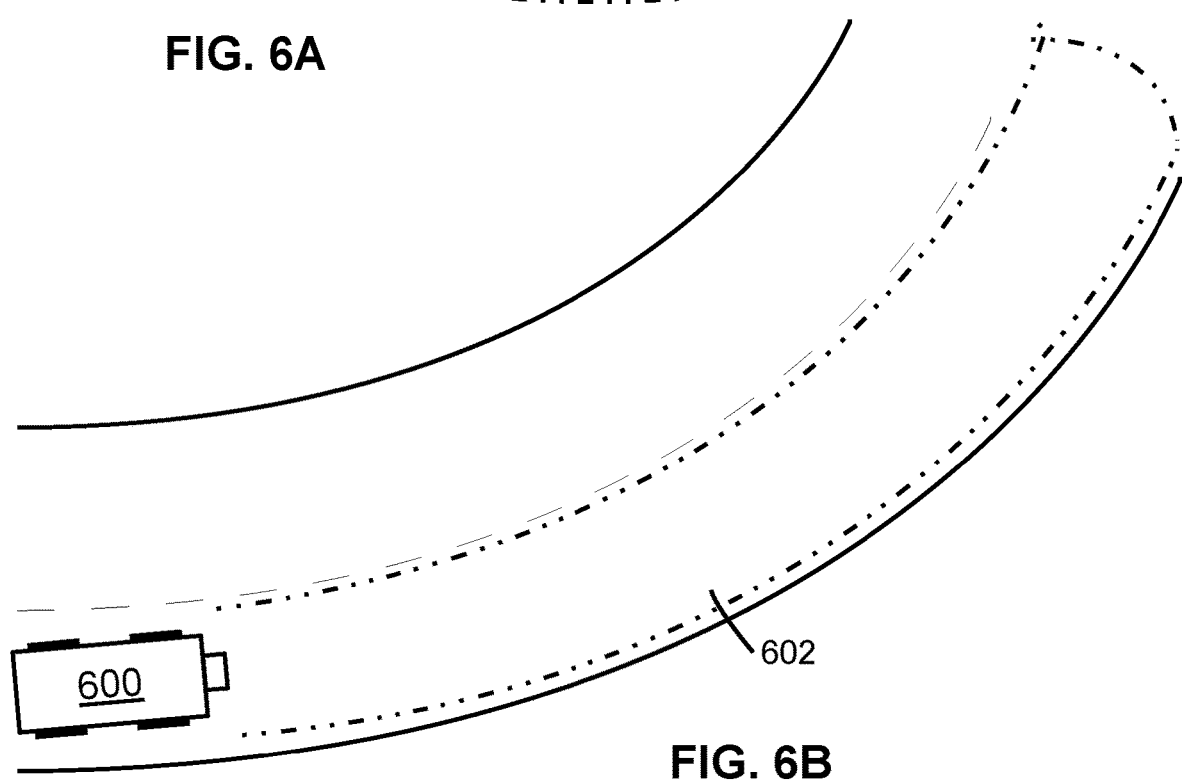

Referring now to FIGS. 6A and 6B, example scenarios are shown according to non-limiting embodiments. In FIG. 6A, a vehicle 600 is shown with a light emission 601 projected in front of the vehicle on a curved roadway. As shown, the light emission 601 does not illuminate the driving path along the curve and instead illuminates areas off of the roadway. In FIG. 6B, a vehicle 600 is shown with a modified light emission 602 that has been generated to account for the curvature in the roads. In this way, digital modification of the lighting data may be used instead of or in addition to motorized movement of the headlights or the like. The curved nature of the roadway may be determined based on navigation data, roadway data, camera detection, and/or the like.

Figure 7A:
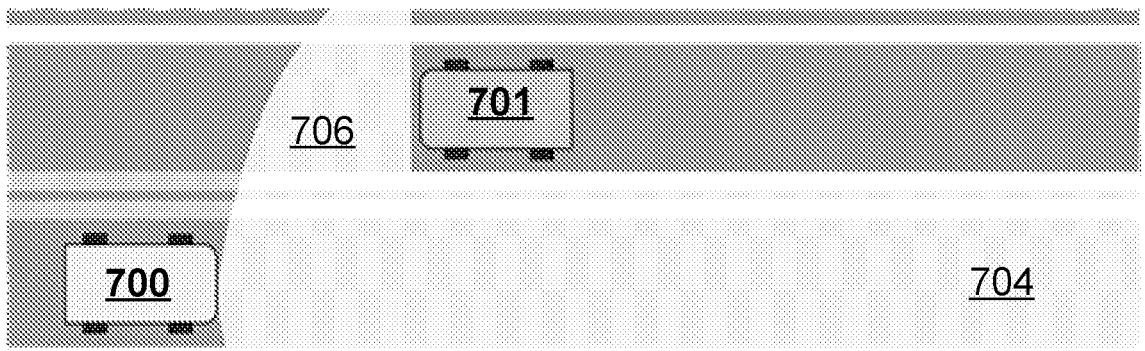
FIGS. 7A-7C illustrate further example implementations of a system for generating a modified light emission according to non-limiting embodiments or aspects.
Figure 7B:
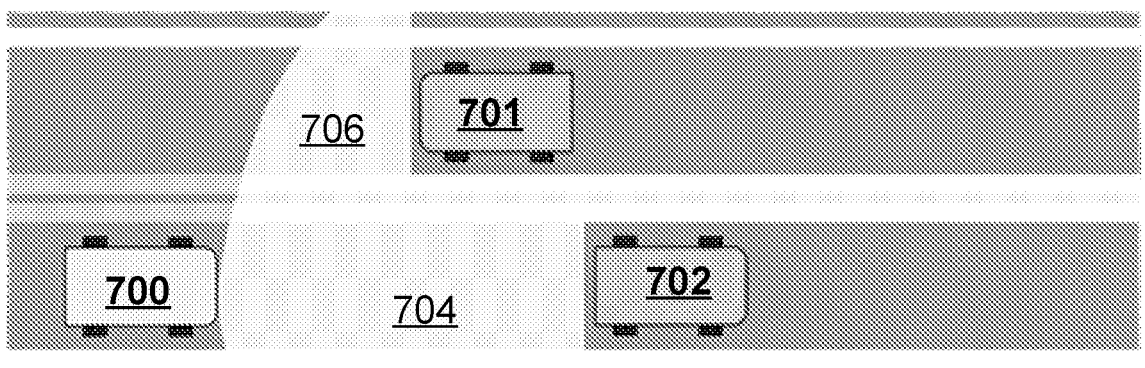
Figure 7C:
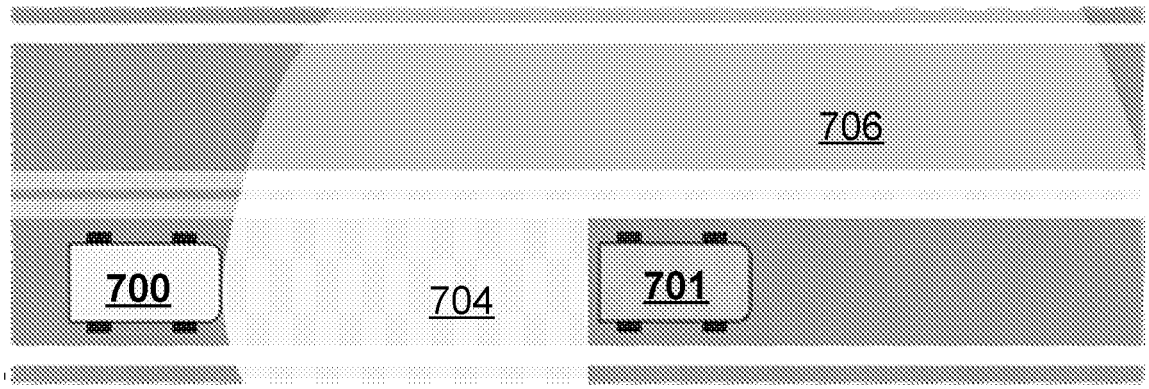

Light emissions that unintentionally illuminate objects on the road (e.g., such as another vehicle) may cause a distraction. Referring to FIGS. 7A-7C, shown are non-limiting embodiments to prevent the projection of distracting light emissions on objects. In these examples, sensors (e.g., such as cameras) and/or image detection algorithms may be used to detect the presence of the objects and dynamically alter the pattern of light that would illuminate the objects to be less distracting. FIG. 7A shows a vehicle 700 approaching another vehicle 701 in adjacent lanes. A portion of a light emission 704 in an open lane extends a distance whereas a portion of a light emission 706 in the adjacent lane extends a shorter distance. The lighting data may be modified based on the detection of vehicle 701 such that it does not project directly on vehicle 701 or reduces the brightness of such light emissions.

In FIG. 7B, a vehicle 700 is approaching another vehicle 701 in an adjacent lane and is following a third vehicle 702 in the same lane. A portion of the light emission 704 in the lane of travel extends a distance to the vehicle 702 whereas a portion of the light emission 706 in the adjacent lane extends a shorter distance to vehicle 701. The lighting data may be modified based on the detection of vehicles 701, 702 such that it does not project directly on vehicles 701, 702 or reduces the brightness of such light emissions. In FIG. 7C, a vehicle 700 is following a vehicle 701 and an adjacent lane is empty of objects (e.g., vehicles). In such an example, a portion of the light emission 704 in the lane of travel extends a distance to the vehicle 701 and a portion of the light emission 706 in an empty adjacent lane extends a longer distance but is dimmer than portion 704. It will be appreciated that various arrangements are possible.

Figure 8:
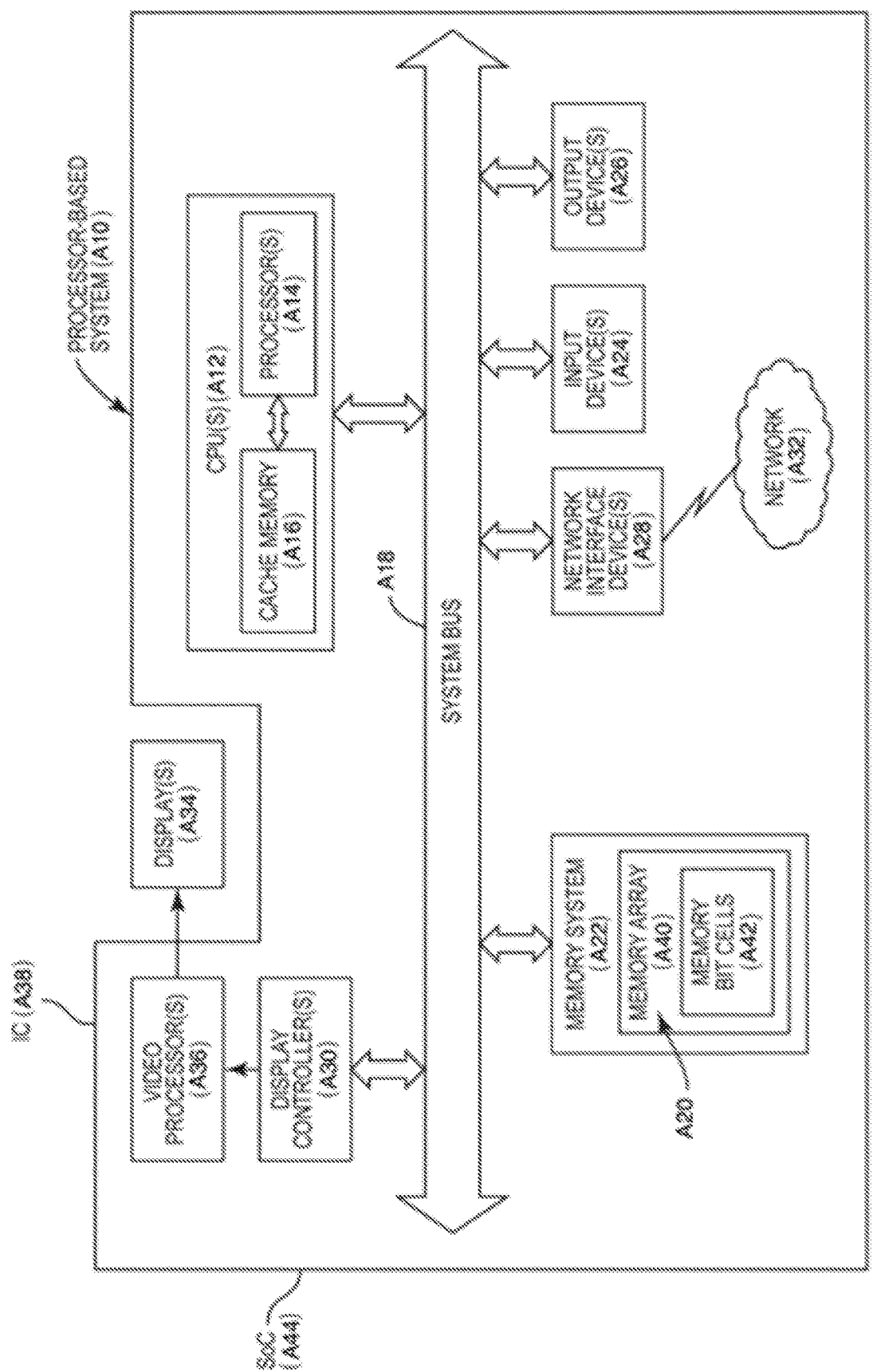
FIG. 8 illustrates an example processor-based system that can employ systems for generating modified light emissions according to non-limiting embodiments or aspects.

FIG. 8 illustrates a non-limiting example of a processor-based system A10 that can employ systems for generating modified light emissions and methods thereof as described herein. In this example, the processor-based system A10 includes one or more central processing units (CPU(s)) A12, each including one or more processors A14. The CPU(s) A12 may be a master device. The CPU(s) A12 may have cache memory A16 coupled to the processor(s) A14 for rapid access to temporarily stored data. The CPU(s) A12 is coupled to a system bus A18 and can intercouple master and slave devices included in the processor-based system A10. As is well known, the CPU(s) A12 communicates with these other devices by exchanging address, control, and data information over the system bus A18. For example, the CPU(s) A12 can communicate bus transaction requests to a memory controller A20 as an example of a slave device. Although not illustrated in FIG. 8, multiple system buses A18 could be provided, wherein each system bus A18 constitutes a different fabric.

Other master and slave devices can be connected to the system bus A18. As illustrated in FIG. 8, these devices can include a memory system A22, one or more input devices A24, one or more output devices A26, one or more network interface devices A28, and one or more display controllers A30, as examples. The input device(s) A24 can include any type of input device, including, but not limited to, input keys, switches, voice processors, etc. The output device(s) A26 can include any type of output device, including, but not limited to, audio, video, other visual indicators, etc. The network interface device(s) A28 can be any devices configured to allow exchange of data to and from a network A32. The network A32 can be any type of network, including, but not limited to, a wired or wireless network, a private or public network, a local area network (LAN), a wireless local area network (WLAN), a wide area network (WAN), a Bluetooth® network, and the Internet. The network interface device(s) A28 can be configured to support any type of communications protocol desired. The memory system A22 can include one or more memory units.

The CPU(s) A12 may also be configured to access the display controller(s) A30 over the system bus A18 to control information sent to one or more displays A34. The display controller(s) A30 sends information to the display(s) A34 to be displayed via one or more video processors A36, which process the information to be displayed into a format suitable for the display(s) A34. The display(s) A34 can include any type of display, including, but not limited to, a cathode ray tube (CRT), a liquid crystal display (LCD), a plasma display, a light emitting diode (LED) display, etc. The processor-based system(s) A10 may also be provided in an integrated circuit (IC) A38. The memory system A22 may include a memory array(s) A40 and/or memory bit cells A42. The processor-based system(s) A10 may also be provided in a system-on-a-chip A44.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or a combination(s) of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A vehicle lighting system comprising:
   at least one signal receiver arranged on a vehicle;
   at least one sensor arranged on the vehicle;
   at least one lighting system arranged on the vehicle as part of a headlight system of the vehicle configured to illuminate a region in a forward direction from the vehicle; and at least one processor in communication with the at least one signal receiver, the at least one sensor, and the at least one lighting system, the at least one processor configured to:
- receive a first signal with the at least one signal receiver;
- receive sensor data from the at least one sensor;
- determine lighting data based on the first signal;
- generate a modified light emission by transforming the lighting data based on the sensor data;
- control the at least one lighting system to output the modified light emission; and
- dynamically update the modified light emission while the vehicle is in motion to output an updated modified light emission.

2. The system of claim 1, wherein the at least one signal receiver comprises a positioning system, wherein the at least one sensor comprises at least one of an inertial sensor and a camera, and wherein the at least one lighting system comprises at least one headlight arranged on the vehicle.

3. The system of claim 1, wherein the at least one signal receiver comprises an antenna, wherein the first signal comprises a wireless signal received from a transmitter arranged in another vehicle or along a roadway.

4. The system of claim 1, wherein the at least one sensor comprises an inertial sensor, wherein the sensor data comprises at least one rotational measurement, and wherein transforming the lighting data based on the sensor data comprises applying the transformation to the lighting data based on the at least one rotational measurement.

5. The system of claim 1, wherein the lighting system comprises a spatial light modulator configured to impose varying spatial modulation on light emitted from a light source to emit the modified light emission.

6. The system of claim 1, wherein the lighting data comprises at least one directional symbol.

7. The system of claim 1, wherein the lighting data comprises illumination of a lane.

8. The system of claim 1, wherein the first signal identifies at least one of the following: a lane marking, a traffic sign, a traffic signal, a traffic management indicator, or any combination thereof, the at least one processor further configured to determine a location of the vehicle based on the first signal, wherein the lighting data is determined at least partially based on the location of the vehicle.

9. The system of claim 1, wherein the at least one sensor comprises an orientation sensor configured to determine an orientation of the vehicle, and wherein the sensor data comprises orientation data representing the orientation of the vehicle.

10. The system of claim 9, wherein the determined orientation of the vehicle comprises at least one of pitch, yaw, and roll of the vehicle.

11. The system of claim 1, the at least one processor further configured to:
- determine topographical data of at least a portion of a surface surrounding the lighting system based on the first signal, wherein the modified light emission is generated based on the sensor data and the topographical data.

12. The system of claim 1, wherein the at least one lighting system comprises an array of light emitting diodes configured to be selectively controlled based on the modified light emission.

13. A method comprising:
- receiving, with at least one processor, a first signal from at least one signal receiver;
- receiving, with the at least one processor, sensor data from at least one sensor arranged on a vehicle;
- determining, with the at least one processor, lighting data based on the first signal;
- generating, with the at least one processor, a modified light emission by transforming the lighting data based on the sensor data; and
- controlling, with the at least one processor, at least one lighting system arranged on the vehicle to output the lighting data, the at least one lighting system part of a headlight system of the vehicle configured to illuminate a region in a forward direction from the vehicle; and
- dynamically updating, with the at least one processor, the modified light emission while the vehicle is in motion to output an updated modified light emission.

14. The method of claim 13, wherein the at least one signal receiver comprises a positioning system, wherein the at least one sensor comprises at least one of an inertial sensor and a camera, and wherein the at least one lighting system comprises at least one headlight arranged on the vehicle.

15. The method of claim 13, wherein the at least one signal receiver comprises an antenna, wherein the first signal comprises a wireless signal received from a transmitter arranged in another vehicle or along a roadway.

16. The method of claim 13, wherein the at least one sensor comprises an inertial sensor, wherein the sensor data comprises at least one rotational measurement, and wherein transforming the lighting data based on the sensor data comprises applying the transformation to the lighting data based on the at least one rotational measurement.

17. The method of claim 13, wherein the lighting system comprises a spatial light modulator configured to impose varying spatial modulation on light emitted from a light source to emit the modified light emission.

18. The method of claim 13, wherein the lighting data comprises at least one directional symbol.

19. The method of claim 13, wherein the lighting data comprises illumination of a lane.

20. The method of claim 13, wherein the first signal identifies at least one of the following: a lane marking, a traffic sign, a traffic signal, a traffic management indicator, or any combination thereof, the at least one processor further configured to determine a location of the vehicle based on the first signal, wherein the lighting data is determined at least partially based on the location of the vehicle.

21. The method of claim 13, wherein the at least one sensor is configured to determine an orientation of the vehicle, and wherein the sensor data comprises orientation data representing the orientation of the vehicle.

22. The method of claim 21, wherein the determined orientation of the vehicle comprises at least one of pitch, yaw, and roll of the vehicle.

23. The method of claim 13, further comprising:
- determining topographical data of at least a portion of a surface surrounding the lighting system based on the first signal, wherein the modified light emission is generated based on the sensor data and the topographical data.

24. The method of claim 13, wherein the at least one lighting system comprises an array of light emitting diodes configured to be selectively controlled based on the modified light emission.

25. A computer program product comprising at least one non-transitory computer-readable medium including program instructions that, when executed by at least one processor, cause the at least one processor to:

receive a first signal with at least one signal receiver;
receive sensor data from at least one sensor arranged on a vehicle;
determine lighting data based on the first signal;
generate a modified light emission by transforming the lighting data based on the sensor data;
control at least one lighting system arranged on the vehicle to output the modified light emission, the at least one lighting system part of a headlight system of the vehicle configured to illuminate a region in a forward direction from the vehicle; and
dynamically updating, with the at least one processor, the modified light emission while the vehicle is in motion to output an updated modified light emission.

\* \* \* \* \*